United States Patent Office.

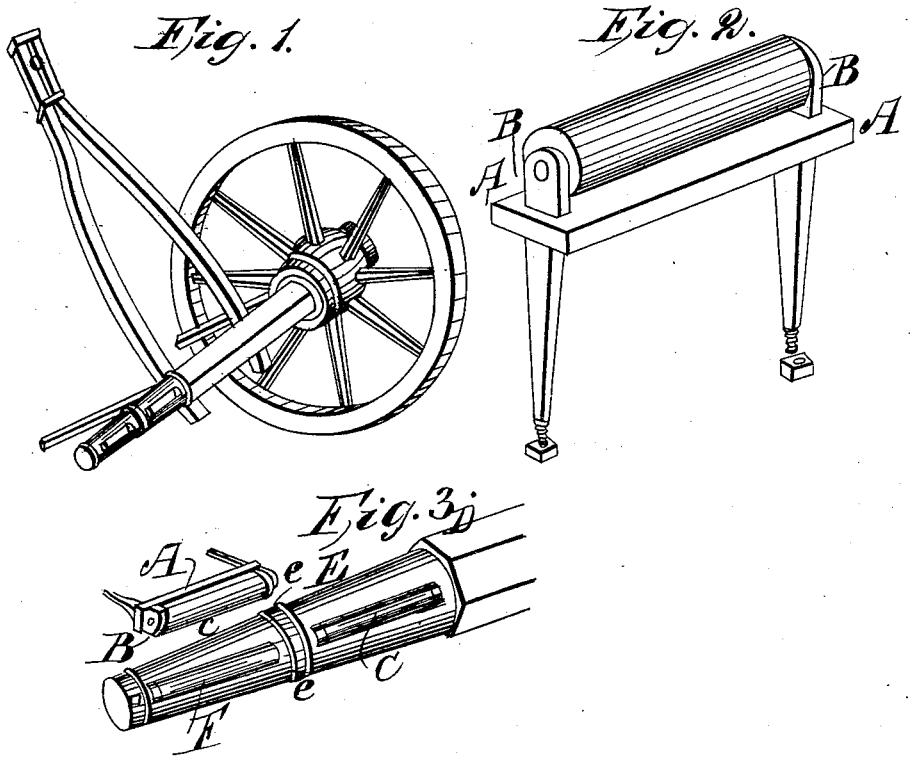

JOHN ELMIRE, OF MARTIC TOWNSHIP, PENNSYLVANIA.

Letters Patent No. 81,079, dated August 18, 1868.

IMPROVEMENT IN AXLES.

*The Schedule referred to in these Letters Patent and making part of the same.*

TO ALL WHOM IT MAY CONCERN:

Be it known that I, JOHN ELMIRE, of Martic township, in the county of Lancaster, and State of Pennsylvania, have invented an Improvement in Wooden Axles for plantation and other wagons; and I do hereby declare that the following is a full and exact description thereof, reference being had to the accompanying drawings, making a part of this specification, in which—

Figure 1 is a perspective view of a portion of a wagon, with one of the wheels removed from the axle-tree to show the under side of the axle, with the anti-friction spindles in place.

Figure 2 shows the under plate and bearings for the cylindrical roller.

Figure 4, an enlarged axle in the position shown in fig. 1, showing the open slot in the wood, with one of the mounted cylinders removed.

The nature of my invention consists in the manner of making the bearings for my cylindrical anti-friction rollers, to be used on wooden axles, so as to be permanent and unyielding.

To enable others skilled in the art to make and use my invention, a brief explanation will suffice.

I provide cylindrical rollers, of cast steel, say one and a half inch in diameter, as long as the boxes, three, or three and a half inches, according to the size used. These rollers or spindles have their bearings in plates B, firmly affixed to and passing through the bed-plate A, as shown in fig. 2. A slot is cut out of the wood at two points on the axle, for the reception of the bed-plate A, with the mounted roller in place, so that the rollers come in contact with their respective boxes, there being two boxes in each nave or hub of the ordinary kind.

I am aware that the use of friction or, rather, anti-friction rollers in the axles of wagons is not new, and various plans have been patented, each peculiar in the construction, of axle-boxes, or thimbles, with flanges and otherwise. But I do not claim a slotted axle or friction-roller as a part of my invention. My invention rather consists in giving to the slot a stout metallic bed-plate, through which the bearings enter, resting against shoulders, so as to give the greatest amount of resistance to the pressure of the hub against the under side of the wheel, where a single pair of such rollers will suffice in a central line, as shown, the prolonged ends of the shouldered bearings secured by a nut and screw, on the upper side of the axle, let in flush with the boxes.

What I claim as my invention, and desire to secure by Letters Patent, is—

The arrangement of a stout bed-plate, A, in combination with the prolonged shouldered bearings B B, inserted through the bed-plates A, and secured by a nut on a screw-end, in the manner shown, when combined with a cylindrical roller C, and inserted in the manner and for the purpose specified.

JOHN ELMIRE.

Witnesses:
   WILLIAM GOOD,
   J. S. LEHMAN.